UNITED STATES PATENT OFFICE.

JOHN HOBBS, OF BOSTON, MASSACHUSETTS.

DEODORIZED FAT OR OXYLINE.

SPECIFICATION forming part of Letters Patent No. 289,100, dated November 27, 1883.

Application filed February 28, 1883. (No specimens.)

*To all whom it may concern:*

Be it known that I, JOHN HOBBS, of the city of Boston, in the county of Suffolk and Commonwealth of Massachusetts, have invented a new and useful Improvement in Deodorized Fat or Oxyline, of which the following is a specification.

My invention relates to the manufacture of a sweet, firm, and deodorized fat known as "oxyline," of the character and substance of cocoa-butter, and intended to take the place of cocoa-butter.

It consists of a compound composed of ingredients, hereinafter named, combined in the manner and proportions substantially as set forth.

I have for nearly ten years last past been engaged in the manufacture of an article resembling cocoa-butter, which, with a view to designate and describe said material or compound, I have during all this time called "oxyline," which is a word that was invented and coined by me, and which was adopted and has been used as a trade-mark by me exclusively ever since. The article oxyline, as I have hitherto made it, has long been known among confectioners, and has been used by them in the manufacture of chocolate-work. The friable nature of the theobroma-cocoa, after being finely powdered, is such that the confectioner is obliged to use, in his manufacture of chocolates of various kinds or forms, known as "chocolate-work," some fatty substance that will not deteriorate the flavor of the chocolate, and oxyline has been used for this purpose. It improves the character of the goods into which it enters in richness and appearance. I have heretofore manufactured oxyline from the pure fat derived from kidney-suets and a mixture of oleomargarine-stearine by substantially the same process which is described further on. I have discovered that the admixture of vegetable stearine to either or both of the said artices produces a compound which gives better results in the objects of its use.

In the process of the manufacture I take fresh suets, or other fats of animals, which I first thoroughly and finely grind, and then render the same at a low temperature in a water bath, where a separation takes place of the pure fat from the tissue, and an article is produced similar to and of the same characteristics of what is known as "oleomargarine-stock." In the manufacture of my improved oxyline I take about one-third of this oleomargarine-stock, and one-third of prime oleomargarine-stearine, and one-third of stearine produced from vegetable fats or oils. Both of these last two are articles of commerce.

I do not confine myself, however, to the above proportions, as the proportions named may be varied according to the season of the year. In the warmer months more of the animal stearine may be used than at other seasons of the year, although I find a most perfect result is derived by using all of the ingredients named, in about the proportions stated; still I have found that a fair article of oxyline can be made by combining the oleomargarine-stock with the vegetable stearine, or by combining the prime oleomargarine-stearine with the vegetable stearine, in either of which cases the amount of vegetable stearine used would be about the same, or one-third. The two or three ingredients which I preferably use are melted in an ordinary water bath at the lowest possible temperature, and when thoroughly incorporated the mixture is drawn off into packages for use or sale.

Having now described my invention, what I claim as new, and desire to secure by Letters Patent, is—

1. In the manufacture of deodorized fats or oxyline, the use or employment of the substance herein mentioned—vegetable stearine—in combination with the other ingredients named—oleomargarine-stearine and oleomargarine-stock, or either of them—as and for the purpose set forth.

2. The herein-described product—deodorized fat or oxyline—which consists of the compound of vegetable stearine with oleomargarine-stearine and oleomargarine-stock, or either of them, as an improved article of manufacture.

In witness whereof I have hereunto set my hand.

JOHN HOBBS.

Witnesses:
WILLIAM B. WRIGHT,
WM. B. H. DOWSE.